Patented May 6, 1930

1,757,468

UNITED STATES PATENT OFFICE

JOHANNES MÜLLER, OF EPPSTEIN, AND ULRICH HOFFMANN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

DEHYDRATION PRODUCT OF SORBITOL AND THE PROCESS OF MAKING IT

No Drawing. Application filed January 7, 1928, Serial No. 245,256, and in Germany June 7, 1927.

We have found that valuable products are obtained from sorbitol by splitting off water therefrom.

According to the conditions employed, the products obtained are poorer in water than sorbitol by 1 or 2 molecules per molecule of sorbitol, and are obtained either separately or in admixture. They can be distilled preferably with reduced pressure and may if desired be separated in that manner. The boiling point of the first-named product is 220° C. (½ mm. pressure) and that of the second 157° C. (3 mm. pressure).

The splitting-off of water may be effected in various ways. Even when merely heated, sorbitol partially disengages water, and also when it is heated with water to about 300° C. under pressure. The heating is preferably conducted in a uniform manner, in the presence or absence of catalysts.

A highly favorable influence is exerted by the addition of acids such for example as sulfuric acid or phosphoric acid, or salts such as sodium bisulphate, or bases such as calcium oxid or sodium hydroxid, especially those which are known to act as dehydration agents, either alone or in admixture with one another. Particularly suitable forms of catalysts are, for example, porous masses such as active silica, active charcoal, active alumina and the like, though other substances may also be employed.

According to the present invention it is unnecessary to employ pure sorbitol, and under certain circumstances it is advantageous to use mixtures of sorbitol with other substances, such as other polyvalent alcohols, which may also under certain circumstances, be capable of suffering dehydration.

The following examples will further illustrate the nature of the said invention, which however is not limited thereto. The parts are by weight.

Example 1

10 parts of sorbitol and 1 part of aluminium oxid are heated at 260° centigrade for 4 hours, the aluminum oxid being then filtered off, and the water formed in the reaction driven off, if so required, by evaporation. The resulting product may be further purified by distillation and, if desired, separated into various anhydro-products.

Example 2

100 parts of sorbitol and 1 part of concentrated sulfuric acid are heated at 140° centigrade for 25 minutes in vacuo, the sulfuric acid being then neutralized for example with sodium hydroxid, and the product distilled. 27 per cent of the theoretical yield is obtained as a dianhydro-product, and 58 per cent as a monoanhydro-product.

If the heating be continued slightly longer, under the same conditions, 81 per cent of the dianhydro-product and 8 per cent of the monoanhydro-product are obtained. If the product be not subjected to distillation, calcium or barium hydroxid or calcium carbonate is employed for neutralization and the sulphate obtained filtered off, the product being then if necessary subjected to clarification with any known decolorizing agents. If desired the water is driven off by evaporation. The total yield is in this case up to 100 per cent of the theoretical.

Example 3

Four parts of caustic potash are dissolved in 100 parts of a mixture containing 80 per cent of sorbitol and 20 per cent of mannitol, and heated for 1 hour at 140° centigrade in vacuo. This is followed by neutralizing the acid and treating it in the manner already described. The yield amounts to 80 per cent of the anhydro-product.

What we claim is:

1. The process for the production of dehydration products of sorbitol, which comprises splitting off water from sorbitol by heating.

2. The process for the production of dehydration products of sorbitol, which comprises splitting off water from sorbitol by heating in the presence of water and under pressure.

3. The process for the production of dehydration products of sorbitol, which comprises splitting off water from sorbitol by heating in the presence of a dehydrating agent.

4. The process for the production of dehydration products of sorbitol, which comprises splitting off water from sorbitol by heating in the presence of sulfuric acid.

5. As a new article of manufacture the dehydration product of sorbitol which is poorer in water than sorbitol by two molecules per molecule of sorbitol and which has the boiling point of about 157° centigrade under 3 millimeters of pressure.

In testimony whereof we have hereunto set our hands.

JOHANNES MÜLLER.
ULRICH HOFFMANN.